United States Patent

Martino et al.

[11] Patent Number: 5,913,185
[45] Date of Patent: Jun. 15, 1999

[54] DETERMINING A NATURAL LANGUAGE SHIFT IN A COMPUTER DOCUMENT

[75] Inventors: Michael John Martino; Robert Charles Paulsen, Jr., both of Austin, Tex.

[73] Assignee: International Business Machines Corporation, Armonk, N.Y.

[21] Appl. No.: 08/772,213

[22] Filed: Dec. 20, 1996

Related U.S. Application Data

[63] Continuation-in-part of application No. 08/699,412, Aug. 19, 1996.

[51] Int. Cl.$^6$ .............................. G06F 17/27; G06F 17/21
[52] U.S. Cl. .................................. 704/8; 704/9; 704/10; 707/536
[58] Field of Search .................. 704/1, 8, 9, 10; 707/531, 532, 533, 535, 536

[56] References Cited

U.S. PATENT DOCUMENTS

| | | | |
|---|---|---|---|
| 3,988,715 | 10/1976 | Mullan et al. | 382/228 |
| 4,610,025 | 9/1986 | Blum et al. | 382/177 |
| 4,773,009 | 9/1988 | Kucera et al. | 707/531 |
| 4,829,580 | 5/1989 | Church | 704/260 |
| 4,890,230 | 12/1989 | Tanoshima et al. | 704/3 |
| 4,930,077 | 5/1990 | Fan | 704/8 |
| 5,062,143 | 10/1991 | Schmitt | 382/230 |
| 5,182,708 | 1/1993 | Ejiri | 704/1 |
| 5,251,131 | 10/1993 | Masand et al. | 704/9 |
| 5,371,673 | 12/1994 | Fan | 704/1 |
| 5,371,807 | 12/1994 | Register et al. | 382/159 |
| 5,392,419 | 2/1995 | Walton | 395/500 |
| 5,418,951 | 5/1995 | Damashek | 707/5 |
| 5,548,507 | 8/1996 | Martino et al. | 704/1 |
| 5,608,624 | 3/1997 | Luciw | 707/532 |
| 5,715,446 | 2/1998 | Kinoshita et al. | 707/5 |

FOREIGN PATENT DOCUMENTS

WO91/02347  2/1991  WIPO .

*Primary Examiner*—Joseph Thomas
*Attorney, Agent, or Firm*—Jeffrey S. LaBaur

[57] ABSTRACT

Language shift points in a computer document written in a plurality of natural languages are determined. An interval is defined on and moved through a text document in a computer memory, the interval contains a portion of the text in the document. As the interval is moved through the document for each position of the interval, a probability that the text in the interval is written in each of a plurality of candidate languages is determined for the position. For the first position of the interval, generally the beginning of the document, a first candidate language is classified as the current language if it has the highest probability of all the candidate languages within the interval. A language shift point in the document is identified where the relative probability of a second candidate language is higher than the current language at a new position of the interval. At this point, the second candidate language is classified as the current language in the document after the language shift point. The process continues to identify other language shift points in the document.

26 Claims, 8 Drawing Sheets

| ENGLISH | ITALIAN | DANISH |
|---------|---------|--------|
| the | di | i |
| of | e | og |
| and | che | at |
| to | la | - |
| - | il | - |
| - | si | - |
| - | é | - |
| - | in | - |
| - | un | - |
| - | a | - |
| - | - | - |
| - | - | - |
| - | - | - |
| - | - | - |
| - | - | - |

FIG. 5

DETERMINING A NATURAL LANGUAGE SHIFT IN A COMPUTER DOCUMENT

This application is a continuation in part of copending, commonly assigned application entitled "Word Counting for Natural Language Determination", Ser. No. 08/699,412, filed Aug. 19, 1996, by the same inventors which is hereby incorporated by reference.

BACKGROUND OF THE INVENTION

The subject invention relates generally to human language recognition technology. More particularly, the invention relates to a technique for identifying the language used in a computerized document.

Computers and computer networks have intensified the transmission of coded documents between people who speak and write in different natural languages. The internet has recently accelerated this process. This results in several problems. In the prior art, for example, when an electronic document was sent across national boundaries, computer system operations were interrupted so that a human being could determine the natural language of a received document before a given operation such as selecting, displaying, printing, and so forth which may be dependent upon the peculiarities of a given natural language.

In the application cited above, the applicants described an invention which eliminates the need for such human intervention by automatically determining the correct natural language of the computer recorded document. A related problem arises when the documents use multiple languages, e.g., language textbooks, scholarly works especially those on languages. Spell checking and the operations discussed above become even more problematic. A subset of this problem is when the "genre" of the text changes, for example, a newspaper which changes from financial news to editorial material. Separate dictionaries have been developed within a single language for specialized content such as that used by the medical and legal professions. However, the prior art requires that human intervention is needed to switch dictionaries when the document switches from one genre to another or one language to another. Thus, there is a need to automatically detect a shift in the natural language or genre within a document.

Prior to the applicants' own contributions to the art, the general problem of natural language identification was recognized in the prior art. In the area of automated language identification of coded text, the prior art used n-gram character based systems, which handle each character multiple times. This process consumes a great deal of system resource when compared to the applicants' word-based technique described below. In speech recognition systems, language recognition uses language and speech characteristics, e.g., trigrams or emphasis. These methods also require large amounts of text to be parsed and measured, and large amounts of time for processing. These techniques are based on some form of matching algorithm based on language statistics that are not meaningful in a linguistic context.

While the prior art has addressed the general problem of language identification, insofar as the applicants are aware, it has failed to address the problem of identifying transitions in language or genre in a document. Nonetheless, the problem has been recognized by the applicants and a solution is presented in the description which follows.

SUMMARY OF THE INVENTION

It is therefore an object of the invention to identify the natural language in which a computer stored document is written from a plurality of candidate languages in a most efficient manner.

It is another object of the invention to identify the transitions between natural languages which occur in a given body of text.

It is another object of the invention to provide a mechanism which is very, very fast.

It is another object of the invention to minimize the memory requirements of the identification process.

It is a further object of the invention to allow the use of more memory and processor intensive dictionaries once the language shifts are identified.

These objects and others are accomplished by detecting language shift points in a computer document written in a plurality of natural languages. An interval is defined on and moved through a text document in a computer memory, the interval contains a portion of the text in the document. As the interval is moved through the document for each position of the interval, a probability that the text in the interval is written in each of a plurality of candidate languages is determined for the position. For the first position of the interval, generally the beginning of the document, a first candidate language is classified as the current language if it has the highest probability of all the candidate languages within the interval. A language shift point in the document is identified where the probability of a second candidate language is higher than the current language at a new position of the interval. At this point, the second candidate language is classified as the current language in the document after the language shift point. The process continues to identify other language shift points in the document.

In one preferred embodiment, the probability of the text within the interval being of a particular candidate language is accomplished by comparing the words in the interval with the words in word lists comprised of common words in each of the candidate languages. The number of words in the interval which match the common words in each respective word list are counted. The candidate language having a highest number of matched words will generally have the highest probability and therefore identified as the current language in the interval.

BRIEF DESCRIPTION OF THE DRAWINGS

FIG. 5 is an example of a word table containing a set of common words in a plurality of candidate languages.

DETAILED DESCRIPTION OF THE DRAWINGS

Figure 1:
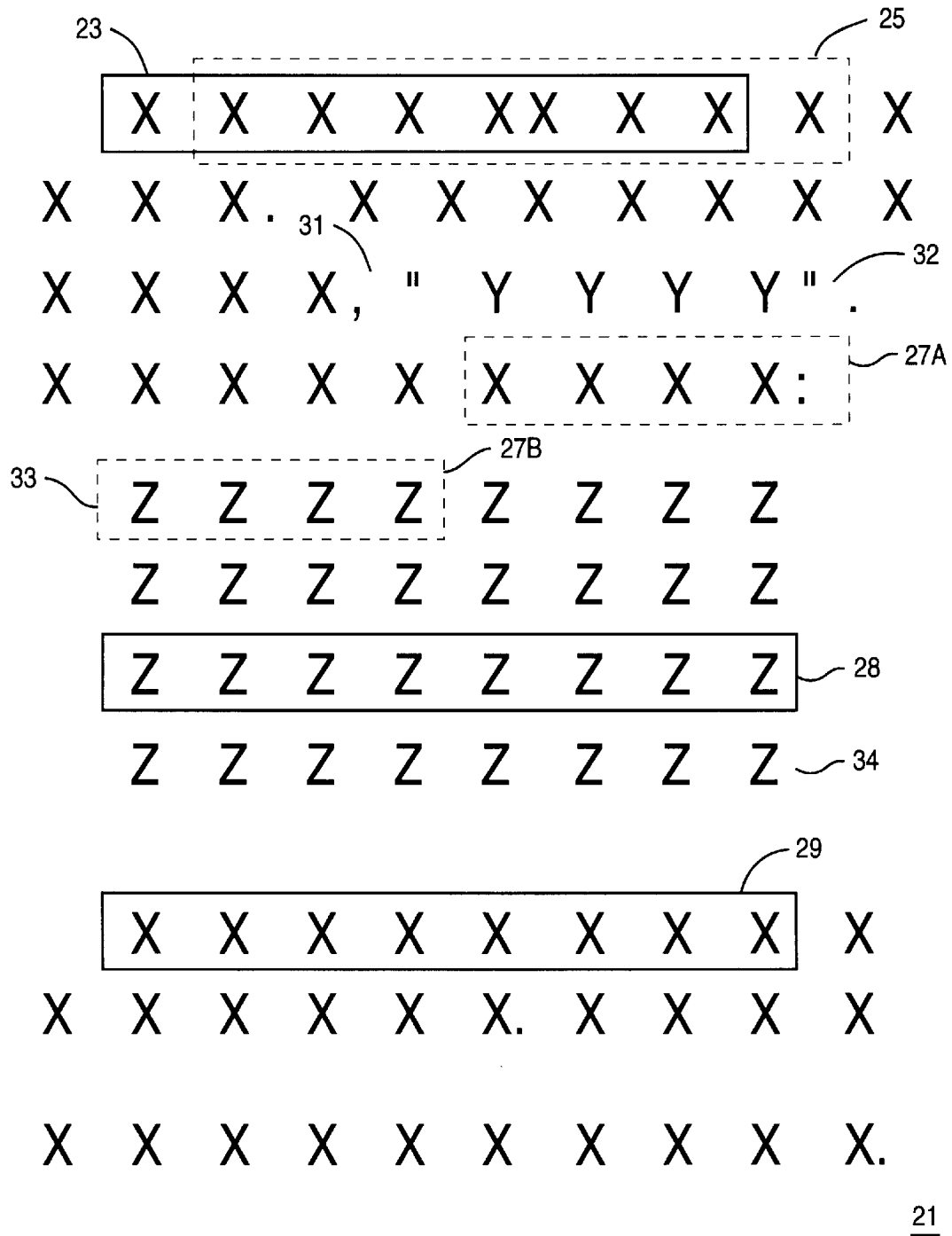
FIG. 1 is an illustration of a page from a document containing multiple natural languages together with the moving interval of the present invention superimposed.

In this specification, the term "language" means a natural language, i.e. human language, used for human communications, e.g., English, French, Spanish, German, and so forth. The term "language", as used in the claims, also applies to "genres" within a natural language. Genre is defined herein as a distinctive style of use of a language in some specific context. For example, genre within English includes technical writing, business writing, legal writing, medical writing, fiction, and many others. Thus, genre applies to different variations of the same language involving different styles and manners of word use within a natural language which are reflected in coded documents, and may involve a distinctive use of standard words in a language or may add new words to a language. Genre may reflect particular jargons and dialects of a language such as High German, Low German, and Swiss German, or as London English and New York English.

Ideographic languages such as Japanese, Chinese and Korean can be handled by this invention in a computer mechanism by choosing an appropriate internally-coded representation for the ideographs, such as the double-byte codes used for such languages in computers today. Thus, the mechanism of this invention can be applied to any language having coded words, without regard to the alphabet or word form required for the human-readable printed symbols used for the respective languages.

Although the invention is described in terms of a preferred embodiment below, it is expected that the invention is also applicable to other means of determining the natural language of a document such as trigrams or n-grams.

Language Switch

The places in a text document at which the natural language, e.g., English, French, Dutch of the body of text changes from one language to another is determined by the use of a moving interval. Within the moving interval, the language statistics of the text are computed with respect to a plurality of candidate languages. With the possible requirements of larger quantities of text within the interval, and possibly different word lists, the invention is extendable to language genre.

In the invention, a moving interval is defined on the subject body of text. That is to say that a set of the first n words, the interval, is read from the document and moved word by word through the document. Within this moving interval, the probability that the text within the interval is one of the candidate natural languages is computed at each position. Probability as used in the specification and claims is not used in a strict mathematical sense but should be construed as type of scores of languages, the higher the score the more likely that the language is the language in the interval. In the preferred embodiment, the recognition percentages of the words within the moving interval are continuously computed and compared for each of the languages under consideration. When the recognition percentage of two candidate languages are equal, that is, the plots of the recognition percentages cross, the point at which the language of the document has changed is identified. Often the language change will occur precisely at the crossover point, and almost always within a few words of the crossover point. As discussed below, other comparative methods such as the slope of the lines can be used to identify the language change point.

Further, additional syntax such as punctuation, indentation and capitalization can be used to precisely identify the language switching point in the text, once the crossover point is calculated. After the crossover points in the document are identified, further processing such as spell checking with the appropriate dictionaries can be performed on the document.

FIG. 1 shows a document 21 in which words in three different languages, language 1, language 2 and language 3, denoted respectively by "X"s, "Y"s and "Z"s are found. The identification process starts when the initial interval 23 is defined on the first eight words of the document. If the word tables have been constructed correctly, the language probability calculation should be very high for language 1 and very low for languages 2 and 3 in the interval 23.

Next, the interval 25 is moved one word through the document. Again, the language probabilities are calculated, dropping the first word and including the ninth word in the calculation. As above, the language calculations should indicate that the language 1 is the current language of the document.

The interval is moved through the document word by word and the language probabilities are calculated for each position for the respective candidate languages. It is possible to change the position of the interval on a greater than one word basis. However, once a language shift is detected, the process may need to back up and proceed on a word by word basis for better discrimination. When the interval 27A and 27B is moved to the transition between languages 1 and 3, there should be a nearly equal calculated probability that the interval is in language 1 or in language 3. This is called a crossover point. When the interval 28 moves so that it is totally in the paragraph of language 3, the probability should be very high that it is language 3 relative to the calculated probabilities of languages 1 or 2.

The interval 29 is moved through the document until it is again in text of language 1. The calculated probabilities will indicate this fact.

Once the interval has passed through the document illustrated in FIG. 1, four crossover points 31, 32, 33 and 34 will have been identified. Notice that these points often occur at syntax points such as punctuation or indentation. In one preferred embodiment of the invention, the process parses the text for such indicia near a crossover point for further refinement or corroboration of the language shift. Note that the syntax alone is insufficient as an indicator as the syntax points occur throughout text written in a single language.

The invention can be run as a batch process, identifying all the language crossover points in the document by probabilities, refining all the identified language crossover points in the document by reference to syntax points and bringing the main language dictionaries on line to perform other processing such as spell checking. Alternatively, the invention could be performed "on the fly" where as each language crossover point is identified, it is refined by syntax and the subsequent processing takes place as the interval is moved through the document.

The first illustrative embodiment is a software or firmware implementation of the invention, however, the invention is intended to include all implementations, including hardware as will be discussed below.

The first embodiment uses a language determination algorithm which is based on the frequencies of occurrence of the words within a language. Given a selected word list in a candidate language when compared to a given interval of text, it is possible to calculate the expected number of "hits"

that will be detected in a text interval of the given language. For example, it is known that the 12 most common words in American English (AE) comprise fully 26% of the average AE document. See Table 1 below. Thus, a word list composed of these 12 words would be expected to generate "hits" for 26% of the words in a text interval of American English.

Table 1 below demonstrates why relatively few words are required to be in a word table. The data for Table 1 are taken from Computational Analysis of Present-day American English by H. Kucera and W. N. Francis and published by the Brown University Press, Providence, R.I., 1967. It lists the twelve most common words in written English in MEASURED FREQUENCY order from top to bottom. The MEASURED FREQUENCY is stated as the average count for each common word per 100 words used in the (written) English language, determined over the total word count in a very large number of English documents. It is therefore the percentage of cases that a word randomly selected from a representative sample of written English text will be that particular word. MEASURED FREQUENCY is equivalent to frequency of occurrence, as that term has been previously used herein. Each CUMULATIVE FREQUENCY in Table 1 is the sum of the MEASURED FREQUENCIES for all words in the table from that point and above. For example, the CUMULATIVE FREQUENCY of 20.307 is shown with the word "in" in TABLE 1 and represents a plurality of common words comprising the six most frequently used words in the English language, i.e. the first six words: "the", "of", "and", "to", "a", and "in" in Table 1. The CUMULATIVE FREQUENCY of 20.307 is therefore derived by adding the MEASURED FREQUENCIES for these six words. Thus, in a representative sample of written English text, approximately 20% of the words in the text will be one of the first six words in Table 1; fully 26% will be one of the 12 words in the table. Thus, relatively few words represent a substantial portion of representative text. Similar tables showing similar statistics can be constructed for other languages.

TABLE 1

The Twelve Most Common English Words

| WORD | MEASURED FREQUENCY | CUMULATIVE FREQUENCY |
| --- | --- | --- |
| the | 6.899 | 6.899 |
| of | 3.590 | 10.489 |
| and | 2.845 | 13.334 |
| to | 2.578 | 15.912 |
| a | 2.291 | 18.203 |
| in | 2.104 | 20.307 |
| that | 1.045 | 21.352 |
| was | 0.995 | 22.347 |
| he | 0.968 | 23.315 |
| for | 0.941 | 24.256 |
| it | 0.936 | 25.192 |
| with | 0.863 | 26.055 |

Similar results are available for many other languages or are straightforwardly computable either from the data of published works or from statistics gathered as needed from writings in the relevant languages.

The invention defines an Interval to be a series of k words taken in order from the body of text under discussion where k is a positive integer. In this paragraph, for instance, letting k=4, the initial interval is "The invention defines an". As the interval moves through the text, subsequent intervals would be "invention defines an Interval" and "defines an Interval to" and so on. This is illustrated in FIG. 1.

In the illustrative embodiment below, the invention is described in terms of k being fixed for a certain number of words for the processing of a given document. However, in alternative embodiments, this is not necessary. In fact, a k whose value varied as the document was processed would offer some computational advantages, e.g., a smaller k means less computing. The size of the interval is the number of words to "move" each time in the interval shift. Fewer words to move is less work. Obviously, where trigrams, n-grams or partial words are used to determine the language within the moving interval, the interval would be based on the relevant unit rather than on the entire word.

In any interval within an American English document, one would expect to find that every fourth word was one of the 12 from Table 1 above. That is, for a body of text written in American English then:

$$\text{Hits} = \text{floor}(0.26 * I(k))$$

where "hits" is the number of AE words from top twelve that will be recognized within the interval. In the description below, this formula is called the "Interval Hit Formula".

The factor 0.26 is the cumulative frequency of occurrence, in AE, of the 12 most frequently occurring words. I(k) is the interval length, in words, for which the number of hits are being computed, and "floor" means to round the result down to the next integer so that "3.5" becomes "3." If k=16, then Hits should average 4 for an American English document in this example. By increasing the number of words in the list, similar formulas can be constructed that will predict the number of hits for any number of input words. Similar formulas can be constructed for other languages based on the relative frequency of words in those languages. The hit formulas are useful for setting up the interval length. According to a preferred embodiment of the invention, the interval should be sufficiently long so as to be relatively certain that at least one word in the interval would match a word in a word list for each of the respective candidate languages, if the language within the interval was that of that respective candidate language.

One skilled in the art will readily appreciate that the "hit" formulas as discussed above are not strictly needed to practice the invention. For example, if the word lists used for each candidate language cover approximately the same frequencies in the respective languages, there is no need for a normalization factor between word lists. Each word list in this embodiment could comprise 40% of a typical text in the respective candidate language. Where word lists of different cumulative frequencies are used to compare different languages, the cumulative frequency of the respective word lists can be used to normalize the number of hits. For example, a 50% list should have twice the hits in an interval as a 25% list.

Now, as the interval is moved through the body of American English text, the number of hits will vary, but will, on average, remain higher than the other languages under consideration. As discussed below in an alternative embodiment, when "strong aliases", common words which occur in more than one language, are removed from the language lists, the other candidate languages should have no "hits" whatsoever except for misspellings and when the interval spans the language switching point. Using an American English word list of the 47 most frequently occurring words will result in a formula for hits as follows:

$$\text{Hits} = \text{floor}(0.40 * I(k)).$$

For other languages, using word lists that provide the same amount of language coverage, empirical evidence has shown that the hit factors will range from zero to 0.25, on average, when processing American English text when the "strong aliases" are left in the word lists. When they are removed, the hit factors for other languages are essentially zero. The applicants' studies have shown that using the rate of change of the hits provides an accurate determination of the language change. The slopes of lines plotting the hits vs. document position indicate that the language change is occurring. The crossover points should be very close to the language shift points.

For the initial interval, the invention computes the recognition percentage of the interval hit function for each of the candidate languages. This is done by comparing all of the words in the initial interval to the words in the word lists of each of the candidate languages and counting the number of hits for each language. The language with the greatest initial recognition percentage is selected as the current language of the document when the interval hit functions for the various candidate languages have been computed. Alternatively and perhaps preferably, a simple count of the number of hits within an interval is performed. The language with the greatest number of lists is selected as the current language. As the interval is moved through the body of text, as long as the natural language of the document remains the same, the recognition percentages as computed by the interval hit functions will remain roughly constant.

When the interval is passed across a language change within the body of text, the recognition percentages of the interval hit functions will change in a predictable way. The recognition percentage of the current language will decrease and the recognition percentage of the new language will increase, leveling out above the functions for the rest of the languages, but in particular, for the previously current language. Prior to the crossover point, the slope of the recognition percentage curve for the current language will become negative, while the slope of the recognition percentage curve of the new language will become positive. At the point where the recognition percentages for the old and new language are equal, the center of the interval will be either on or within a few words of the language change in the body of text.

Figure 2:
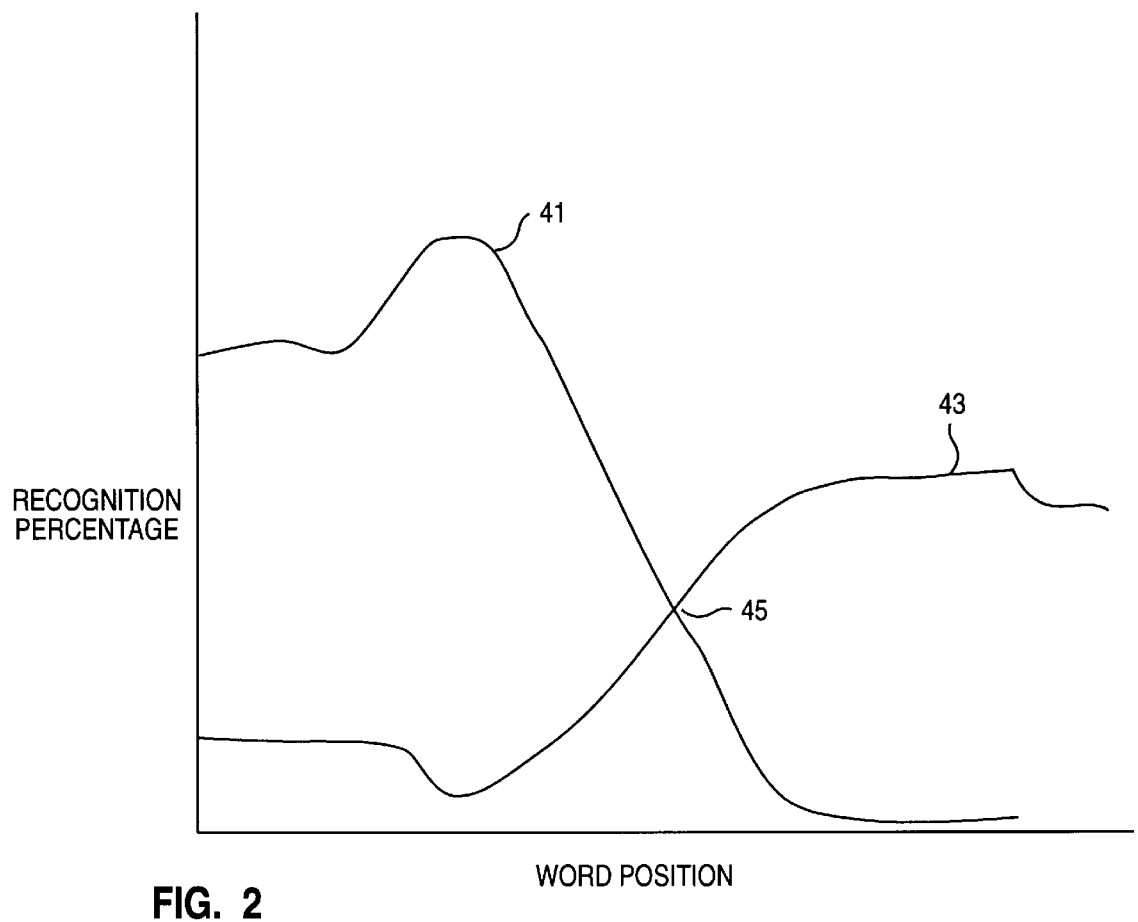
FIG. 2 shows a plot of American English and French recognition percentages vs. position for a sample of text in American English and French showing a crossover point where the text changes natural language.

FIG. 2 shows a plot of the recognition percentage curves for American English 41 and French 43 for a text sample using an interval length of 16. The first sixteen words are used to establish the initial values for the languages. At word 16, the recognition percentage for English, over the interval of 16 words, is 0.4375 and for the French it is 0.125. The slopes are actually a plot of the "words recognized" by interval size, so the 0.4375 (0.4375×16)=7 for English means there is 7 words in the interval recognized as English 0.125 for French means 2 French words are recognized. As the measurement interval is moved through the sample, the recognition percentages within the interval for English and French vary as shown in the figure. For the English section of the sample, the mean value of the recognition percentage is about 0.53; for French for the English section, the value is about 0.16. After the language change, i.e. in the French section, the mean value for the English is about 0.16 and for the French, the mean recognition percentage is about 0.42.

In this example, the recognition percentages for French and English are equal when the leading edge of the measurement interval moves from word 37 to word 38. At this point, the crossover point 45, the center of the interval is at or very close to the point where the language has changed. In fact, the center of the interval is between words 30 and 31, or has just passed from the last English word to the first French word, demonstrating the detection of the language change in the text. The figure and the above comments were based on Text Sample A below.

Text Sample A: Fourscore and seven years ago our fathers brought forth on this continent a new nation conceived in liberty and dedicated to the proposition that all men are created equal. Measure directe de la distribution des de temps de sejour de la phase gazeuse lois d'extrapolation. Les remblais en polystrene expanse de l'autoroute A8 a Mandelieu.

As can be seen, the language change from American English to French occurs after the 29th word ("equal").

Figure 3:
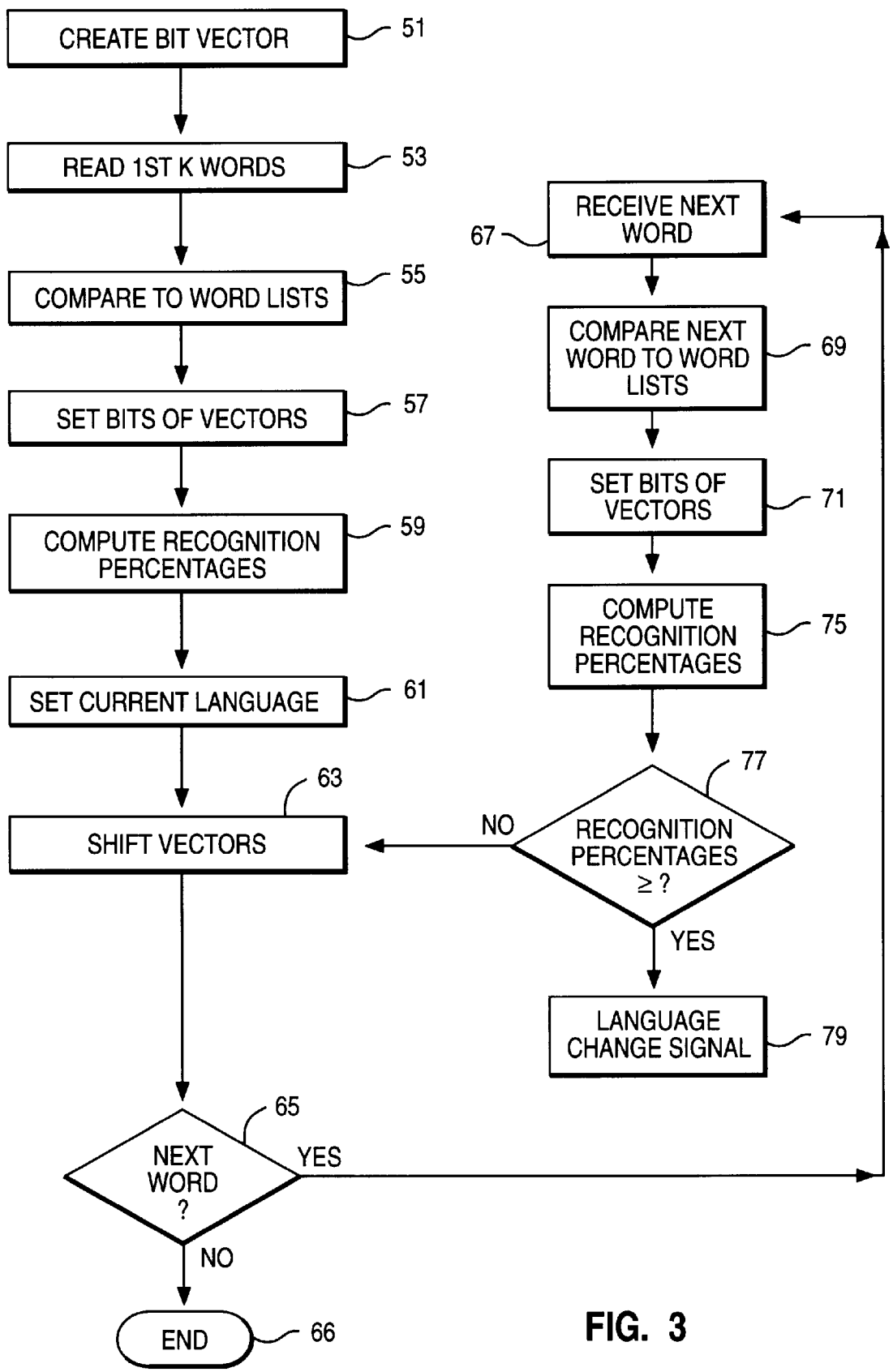
FIG. 3 is a flow diagram of the determination of the crossover points to determine the language change points in a body of text.

The preferred method of implementing this invention is shown in FIG. 3. In step 51, for each language L, in the set of languages L under consideration, a bit vector of length k is created. The bit vector k is equal to the length of the measuring interval which is chosen such that it reliably separates the languages with the given set of word lists. In the case of genre separation, the moving interval should be chosen to separate reliably the genres. Call the vectors vl(L,k), where L varies over the languages and k is the number of bits in the vector. Typically, a moving interval of between 8 and 32 will suffice. In this example, a measuring interval of 16 is used.

In step 53, the first k words from the body of text are read in to the respective comparators for each language. In step 53, the words are compared to the word lists for the respective languages to determine the matches or hits. In step 57, the bits of the respective language vectors are set for the determined matches. For each language l in L, if word(i) belongs to the word list for language l, then set the vl(l,i)=1, else vl(l,i)=0.

For text sample A above, the two initial vectors in American English (AE) and French (F) are:

vl(AE)=0 1 0 0 1 1 0 0 0 1 1 0 1 1 0 0 vl(F)=0 0 0 0 0 0 0 0 0 1 0 0 0 1 0 0

Vector vl(AE) corresponds to hits in the English word list from the words, "and," "ago," "our," "on," "this," "a" and "new." The vector vl(F) got hits on "on" and "a.". If all of the strong aliases were removed from the French word list, the entire vector would be zeros.

In step 59, the recognition percentage is computed for the interval by dividing the words recognized in that language by the interval length.

$$R = \frac{\text{words rec}}{\text{int length}} \times 100\%$$

for each of the languages. Normalization may be needed when the word lists used for the respective candidate languages are not substantially equivalent in coverage. Also, as mentioned above, the unnormalized hits can be used in determining the crossover point without calculating a recognition percentage. In the illustrative example, the vectors vl(AE) and vl(F) are summed to determine the number of hits for each respective languages.

The recognition percentage for a language, 1, is denoted r(1), and is the number of words recognized in each of the languages divided by the number of words in the interval. For the initial interval in the illustrative example, the recognition percentages are:

$r(AE) = ((i=1 \text{ to } 16) \text{ SIGMA } vl(AE))/16 = 0.4375$, and $r(F) = ((i=1 \text{ to } 16) \text{ SIGMA } vl(F))/16 = 0.125$.

These values are then stored in a list for each respective candidate language.

In step 61, the current language is set to the vector with the largest recognition percentage; that is, choose the language with the largest r(1). In this example, American English has the largest r(1), so the Current Language parameter, cl(1), is set to AE or cl(AE).

In step 63, all of the vectors are shifted by one, dropping the oldest element from all vectors. That is, set vl(1,1)=vl(1,2), vl(1,2)=vl(1,3), . . . , vl(1,15)=vl(1,16), i.e. (for all 1 in L) (i=1 to 15), vl(l,i)=vl(l,i+1).

In step 67, the next word, word(i), is received from the body of text. In the illustrative example, the 17th word from sample text A is the word "in". Alternatively, the interval could get increasingly smaller as the oldest word is repetitiously dropped. In practice, however, there will be some smallest interval which would be useful for determining the language shifts. Smaller intervals would not be expected to have a sufficient sample size, unless a large dictionary was used to properly discern the language shift. The moving interval itself should be chosen to be as small as practical to limit computation. Likewise, the word lists should be chosen to be as small as practical, i.e. represent the a relatively large percentage coverage of the language with a relatively few common words.

If there is no next word in the body of text, step 65, then signal end of processing and exit, step 266.

In step 69, the new input word is compared to the word lists for each language to determine the hits for the respective languages. In step 71, vl(1,16) is set to 1 if the word is in the dictionary for language 1, or else set vl(1,16)=0, i.e. (for all 1 in L) IF word(i) in 1, THEN vl(1,16)=1; ELSE vl(1,16)=0. In the example, the next word, "in", is in the word list for AE, so vl(AE,16)=1, and as it happens, "in" is also in the French dictionary so vl(F,16)=1 as well.

Since "in" appears in the word lists for both English and French, the vectors now look like:

$vl(AE) = 1\ 0\ 0\ 1\ 1\ 0\ 0\ 0\ 1\ 1\ 0\ 1\ 1\ 0\ 0\ 1$ $vl(F) = 0\ 0\ 0\ 0\ 0\ 0\ 0\ 1\ 0\ 0\ 0\ 1\ 0\ 0\ 1$

In step 75, the recognition percentages are recomputed for the new vector components and stored. Since the vector lengths are fixed, this can be done by a table lookup using the number of 1 bits in each vector. In the example, the new recognition percentages are:

$r(AE) = ((i=1 \text{ to } 16) \text{ SIGMA } vl(AE))/16 = 0.500$, and $r(F) = ((i=1 \text{ to } 16) \text{ SIGMA } vl(F))/16 = 0.1875$.

In step 77, a test determines whether there are any recognition percentages equal to or greater than the recognition percentage for the current language, i.e. cl(AE). In psuedocode, this step could be written:

```
(for all 1 in L) IF r(1) >= r(cl(1))
    THEN DO cl(1) = 1
        Signal language change
    END
```

In the second interval of the illustrative embodiment, there is no language shift, so the current language, cl, is not updated. If one of the recognition percentages is equal to or greater than the current r(AE), then the natural language has changed from American English to the language represented by that vector. Thus, in step 79, the current language variable is updated and a language change is signalled.

At this point, the process returns to step 63 where the oldest element is dropped from the vectors. The main loop repeats until there are no more words in the text to be evaluated.

Referring again to steps 77 and 79 in the example above, the method will detect a language shift as the text changes from American English to French. At word(37), "temps", the vectors vl(AE) and vl(F) are as follows:

$vl(AE) = 0\ 1\ 1\ 1\ 1\ 0\ 0\ 0\ 0\ 0\ 0\ 0\ 0\ 0\ 0\ 0$ $vl(F) = 0\ 0\ 0\ 0\ 0\ 0\ 0\ 0\ 0\ 1\ 1\ 0\ 1\ 1\ 0$ and the new recognition percentages are:

$r(AE) = ((i=1 \text{ to } 16) \text{ SIGMA } vl(AE,i))/16 = 0.25$ $r(F) = ((i=1 \text{ to } 16) \text{ SIGMA } vl(F,i))/16 = 0.25$ Thus, at this point, the method will examine the two vectors and determine that there has been a change in the current language from American English to French. The center of the interval is between words 30 and 31, thus the language shift point is logged for further refinement.

It should not have escaped the reader that the actual language shift occurred between words 29 and 30 rather than between words 30 and 31. Once the process shown in FIG. 3 is complete, all the language shift points are logged. The invention envisions a further degree of refinement in the language shift points before spell checking or other operations are begun. In the embodiment where the strong aliases between languages are deleted from the word lists, the first instance of a match of a language other than the current language is a strong indication, barring misspelling, that a language change has occurred. The language change should occur somewhere between the last matched word in the current language and the first matched word in the new current language. In addition to the crossover point, the last matched, first matched word pair is another indication of the actual language shift.

Figure 4:
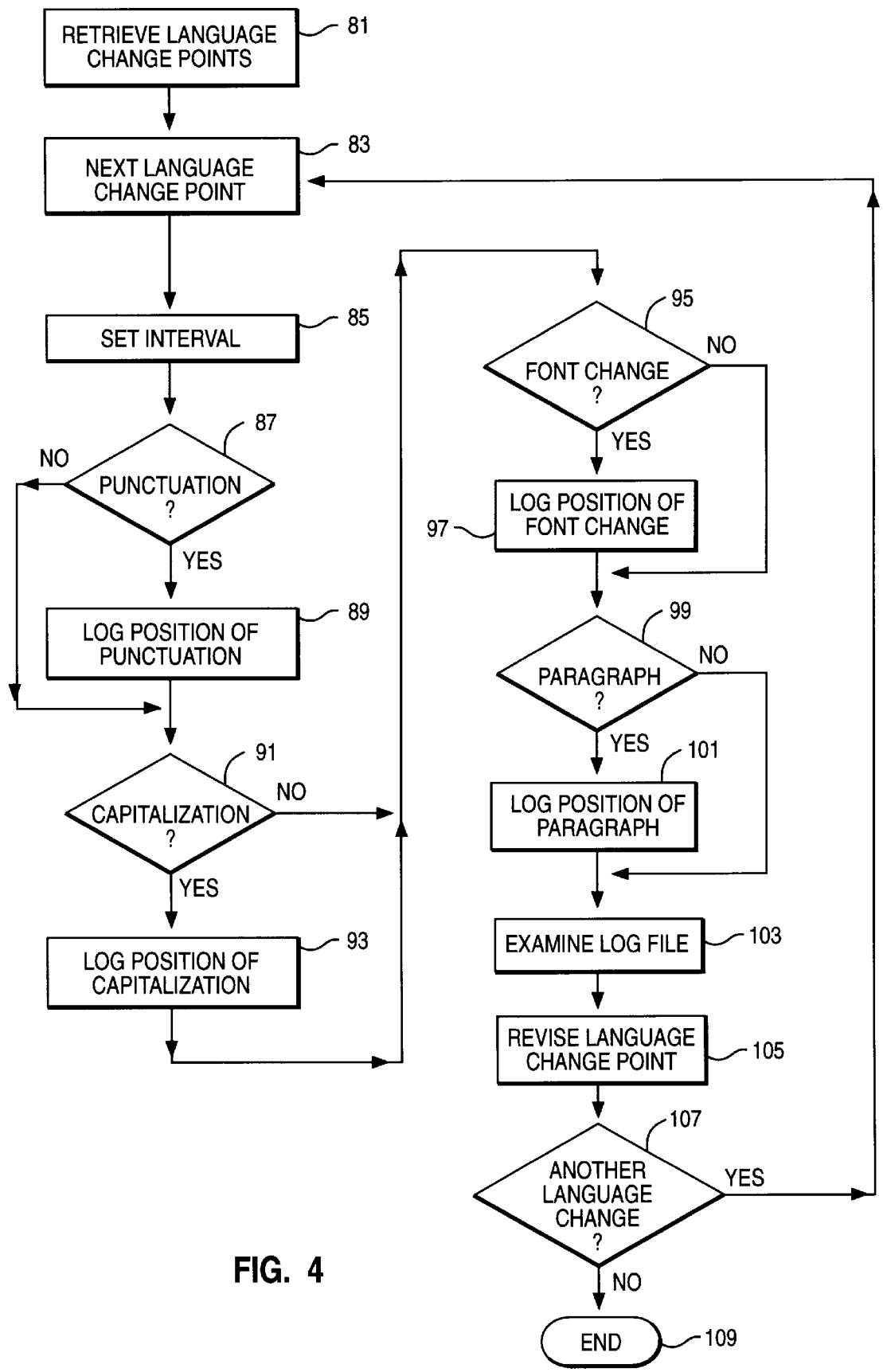
FIG. 4 is a flow diagram of the process to refine the language change points by examining the syntax of the document in an interval around a crossover point.

It is the applicants' observation that a language change is often accompanied by other changes in the text such as punctuation, capitalization, font change or paragraphs. Once the language shift points are identified, the method searches for these other changes in an interval centered around the the identified shift point. This process is shown in FIG. 4.

The process for refining the language shift points begins in step 81 where the log of the language change points as determined by the crossover points is retrieved. Next, in step 83, the text is forwarded to the next shift point, in this case, the first logged change point. Next, in step 85, the interval is set around the first logged shift point. The last matched word in the current language and the first matched word in the new current language can be used as the boundaries of the interval or the interval could be some default value, e.g., five words before and five words after the logged shift point.

A series of tests begins. In step 87, a search for punctuation such as a period, comma, or quotation marks is conducted. If any punctuation is found in the interval, its position is logged in step 89. Then, in step 91, a search for capitalization is conducted. If any is found, its position is logged in step 93. In step 95, a test for font change such as italics is performed. If a font change is found, its position is logged in step 97. Next, in step 99, a search for a paragraph change or other indentation is conducted. If found, in step 101, the position of the paragraph change is logged. Those skilled in the art will recognize that other equivalent tests could be added to the process and that these tests can be done in parallel.

In step 103, the log file is examined for the punctuation, capitalization, font changes or paragraph changes which indicate where the language shift precisely occurred. There may be several such indications, e.g., a period occurring immediately before a capital letter. In step 105, a decision is reached on the language shift point, the logged shift point is moved if necessary. In step 107, the process determines whether another language shift point is logged. If so, the process returns to step 83. If not, the process ends, step 109.

While smaller is better computionally, if the interval is too small, a large dictionary will be required. Enough words should be in the interval so that using one of the hit formulae, one can be relatively certain that at least one word in the interval would be identified at all times.

A single word interval would not be possible if the preferred common word list method of identification were used. There are too many strong aliases between many candidate languages particularly when the word lists are long as would be required. A very short interval could be used with one of the alternative methods of identification such as trigrams. Each doubling of the words in an interval would reduce the number of words in the word lists by more than half to have the same relative certainty that one of the words would be recognized in the interval. A two word interval might be technical feasible for the preferred method of language identification. However, unless the system recognized both as in different languages, the determination of the language shift points would require additional interpolation.

It is also possible an interval is composed of nonadjacent words, e.g., a word pair or two groups of words separated by k words. The distance between the two words should be relatively small, thereby narrowing the location of the shift. However, implicit in that idea is that the system already recognized the two words as in different languages.

In concept, a nonadjacent word pair would move through the text like this:

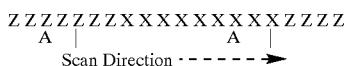

where each "A" is at the point at the last word recognized in each of the two languages and "|" is pointing at the words now being examined. A variable length interval may also be used and has some advantages.

In the example of Text Sample A, the refinement process would find both the period after equal in the punctuation test and the capital "M" in "Measure" and conclude correctly that "Measure" is the start of the new language.

After the language shift points are finalized larger dictionaries may be called to bear on the text segments now that the text within them has been identified and delimited. As mentioned above, spell checking dictionaries for each identified language could be used to check the spelling of words within the appropriate sections of text. Translation dictionaries could be called to modify one or more languages in the text. The larger dictionaries require more storage than the short word lists of common words. Further, identifying the language shift points by reference to these large dictionaries would be much slower, if at all possible.

While the invention has been described above certain aspects of the preferred embodiment are described in greater detail below. Other detail is found in "Natural Language Determination Using Partial Words", Ser. No. 08/723,815, filed Sep. 30, 1996 by the same inventors which is hereby incorporated by reference.

Generating the Word Tables

The word tables can be constructed by reference to scholarly works in which a large sample of words from the respective candidate languages have been counted. The word tables can simply be a list of the most common words in the respective candidate languages or may include weights associated with the most common words. In the vector approach described above weights are not used. However, rather than the binary approach, where the word is either a hit, i.e. "1", or a miss, i.e. "0", the vector could contain weights of the various words which would then be summed. The weights can be computed in a variety of ways, although the applicants presently believe that the most preferred weight is as closely representative of the actual frequency of occurrence of the word in the language as possible.

Language statistics, such as those shown above in Table 1, show that the words which are most common in a language are the most useful in making a language identification. The definition of a common word in a language is that it is a word that is used frequently in that language. As a result, common words from a language will appear in essentially all written communication; hence the process of this invention will find them.

Normalization or other efforts to make the frequencies in the word tables equivalent may be required. The normalization of the frequencies in the word tables is to make a 12% occurrence in American English equivalent to a 12% occurrence in French in the respective word tables. The normalization described above with reference to the identification process is different. It seeks to make the hits from word lists with different frequencies, e.g., an American English word list with a cumulative frequency of 50% and a French word list with a cumulative frequency of 40%, equivalent to each other. The sample sizes may be different from one language reference to the next, the sample sizes may be unknown, or the lists of the most common words taken from the samples may be different cumulative amounts of the different languages. Where one does not have the same amount of information of the same type for each language, normalization is generally a good idea. Where equivalent information is available for all of the candidate languages, normalization is not required. Ser. No. 08/723,815 incorporated by reference above discusses normalization techniques which can be used to construct the word tables.

When preparing word tables, it is not necessary to include weighing factors in the actual word tables unless they are actually used. In the binary approach counting each occurrence of the common words selected for the word tables for each language is generally sufficient for discrimination among the candidate languages. However, as discussed below, weighted vectors are useful for distinguishing between genres. Of course, the weights themselves add little additional storage requirement and if present in a word table, need not be used. Where the strong aliases are removed, weights have no application, since the words will occur in a single word list.

As an alternative to the scholarly sources discussed above, the word frequencies for the words in each language or genre of interest may alternatively be determined by having a data processing system count the words in a large number of documents in an environment in which the invention is to be used. This approach may be more useful than using scholarly sources when the particular environment mixes jargon, or colloquialisms, in one or more of the languages of interest, which often occurs, or if one is attempting to distinguish different genre in the same language.

To construct a word table for the most frequently occurring words in a given language or genre where the actual frequency of the words within the language is known, the following method can be used. Step 1: Compute the total number of occurrences for each of the most common n words in each of the languages under consideration. Step 2: Place each of the most frequently occurring words in each of the languages in the Word Frequency Tables until the amount of coverage of each respective language is reached. Thus, the frequencies of occurrence in the simple counting method are merely used to set up the word lists in the word table to assure that the words in each have a substantially equivalent coverage of each of the candidate languages.

Where strong aliases between languages are avoided, certain common words which occur in the candidate languages are not included in the word lists. In some embodiments of the invention, the languages used within the document are not known in advance. In such cases, all strong aliases which occur between any of the candidate languages are removed from the word lists. However, in other cases, e.g., an Italian language text on how to speak German, there are only two candidate languages, both of which are known. In this case, only the strong aliases between German and Italian should be removed. Thus, the reader can see that a plurality of word lists for each candidate language are envisioned, depending on whether the candidate languages are known before the text switch points are to be determined and if known, what set of candidate languages are to be tested.

Alternatively, a single word list might be used, but with information on which common words are potential strong aliases embedded therein. When the set of candidate languages is chosen, the appropriate words are removed from the word list. If no candidate languages are chosen, all of the potential strong aliases are removed. Alternative common words may be added to the word lists to make the various word lists equivalent in coverage once the strong aliases are removed.

A weighted word table for the most frequently counted words in a given language or genre can be computed, the following method can be used: Step 1: Determine a divisor. This is either the sample size, if known, or the sum of the counts of the n words in each word list. Step 2: For each of the n words in each of the word lists for each of the given languages, divide its measured frequency of occurrence by the divisor from Step 1. Call this value the Normalized Frequency of Occurrence (NFO). Include enough words to obtain the desired coverage of each candidate language. Step 3: Associate each Normalized Frequency of Occurrence (NFO) with the respective word in the Word Frequency Tables.

As above, there may be more words in the word table for one candidate language than in the word table for another candidate language and one or more most common words may be excluded in a given word list to obtain equivalent coverage over all word tables. As mentioned above, weighing may be especially helpful in distinguishing among genre as most of the same common words are apt to occur in most, if not all, genres within a single language. The differences between genre can be detected in the slight changes in frequencies between the genres.

FIG. 5 depicts portions of word tables for English, Italian and Danish. Note that no weighing factor is included in the tables. For example, in English, 46 words are adequate to give an approximate 40% coverage, whereas in Italian, 148 words are needed. More words would be required for a 40% coverage if the strong aliases were removed.

The overall effect of these language statistics is that an examination of about 100–200 words from a document in an unknown language using the method of the present invention with the 25–200 most common words the in each of the candidate languages is ordinarily sufficient to determine the language of the document accurately. In the general case, the applicants try to achieve approximately 40 percent coverage of the language in the respective word tables. This can usually be achieved with fewer than 200 selected common words.

Aliasing

In the above referenced application, two studies were presented that indicated that sufficient discrimination between languages was possible with the storage method described below even when strong aliases were included in the word lists. As mentioned above strong aliases occur between words of different candidate languages. Weak aliases occur between words of the same languages when the words can be truncated, e.g. partial words, before comparison. In the first study, all the tables for the most frequently used words comprising 40% of American English were constructed using all of the words stored in four letter tables. Aliasing was examined for American English versus the Germanic languages: German, Dutch, or Danish. The applicants note that this is a worst case as alternate embodiments use separate tableaus for storing words of different lengths, thus making the tables even more sparsely populated.

The dropping of a few of the words in the top 40% of American English is not significant. Dropping "been" results in coverage of 39.8% (down 0.2%), dropping "would" takes the coverage down another 0.3% and dropping "are" brings the coverage to 39.1%. The coverage can be increased, if desired, by adding a few additional words to the remaining words.

Also, partial words can be used to identify languages. The study indicated that using the first four characters of a word in a single set of tables is workable. With the exception of "wo" none of the weak aliases of American English is also a common strong alias in any of the Germanic languages: German, Danish or Dutch. Note that the applicants do not conclude that none of the aliases occur in any other language; only that they do not occur in the top 40% in a particular set of candidate languages. Hence, there is very little risk from strong aliasing the Germanic languages into English. Other sets of candidate languages may require that other common words be dropped from the word tables to minimize strong aliasing. Using the full table set for all word lengths eliminates much of the aliasing. Further, even if some strong aliasing did occur so long as it was relatively infrequent, the invention will adequately identify the language of the document.

The study also concluded that, if using 27 by 27 bit tables to store the words as described below, i.e. to allow for the use of the blank with the 26 letters, 54 1-bits per table is sparse enough. The most populous table has 54 letter pairs in it and the performance is acceptable. Setting 54 1-bits out of 27×27 or 729 yields a percent set of 7.4%. It is safe to say that the system will work satisfactorily if 7.5% or fewer of the bits in a particular table are set. In fact, a safe working limit is likely to be several percent higher.

The study also concluded that based on these results with the Germanic languages, it is unlikely that strong aliasing will ever be a problem provided that the tables are kept sparse. As can be seen from the weak aliases, the likelihood is that any aliasing that occurs will produce "words" whose characteristics more nearly match those of the given language than a different language. In retrospect, this result is to be expected since the single letter and digraph frequencies are known to vary by language. The extension to letter groups composed of non-adjacent letters is still driven by the underlying single letter and digraphic frequencies. In short, strong aliasing is an unlikely possibility if high frequency words are used in the word tables.

A second study using the comparable word tables and verification lists was conducted for French. The results are better than English due chiefly to the more limited use of letters and letter combinations within the top 40% of French words as compared to English. English, especially American English, has drawn on many more language sources for its words historically than has French; this broader draw causes a greater dispersion in letter combinations than many other languages. A second, and somewhat less important reason for the reduced aliasing is the larger French alphabet. The number of aliases is only 4, although two of these are strong aliases, "das" with German and "el" with Spanish and Portuguese. "Da" would also likely be a strong alias with Russian. These are easily eliminated by dropping the indicated words. Dropping the indicated wordsbelow would reduce the coverage for French by about 4.9% to 36.1%; this is a large enough percentage that other common words should be selected to make the language coverage equivalent in the word tables. Again, the applicants conclude that aliasing is not a problem for French. Further, it can be reduced or eliminated by selection of common words should there exist a language in which it is a problem.

Language Identification

One preferred embodiment of the present invention is the combination of a novel computer program executing in a conventional data processing system. Alternatively, the invention may be embodied in special purpose data processing hardware (not shown) which has separate comparator controls for operating with tables embedded in special storage hardware.

Among the advantages associated with a binary hit/miss vector are the simplification of data collection, in that simple counting of relatively small amounts of text will provide the word lists that are needed, and the ease of implementing the method in hardware and software, and elimination of the normalization requirement. Counting in hardware, that is, incrementing by 1 under one or more specified conditions, is fundamental to computing machines.

Figure 6:
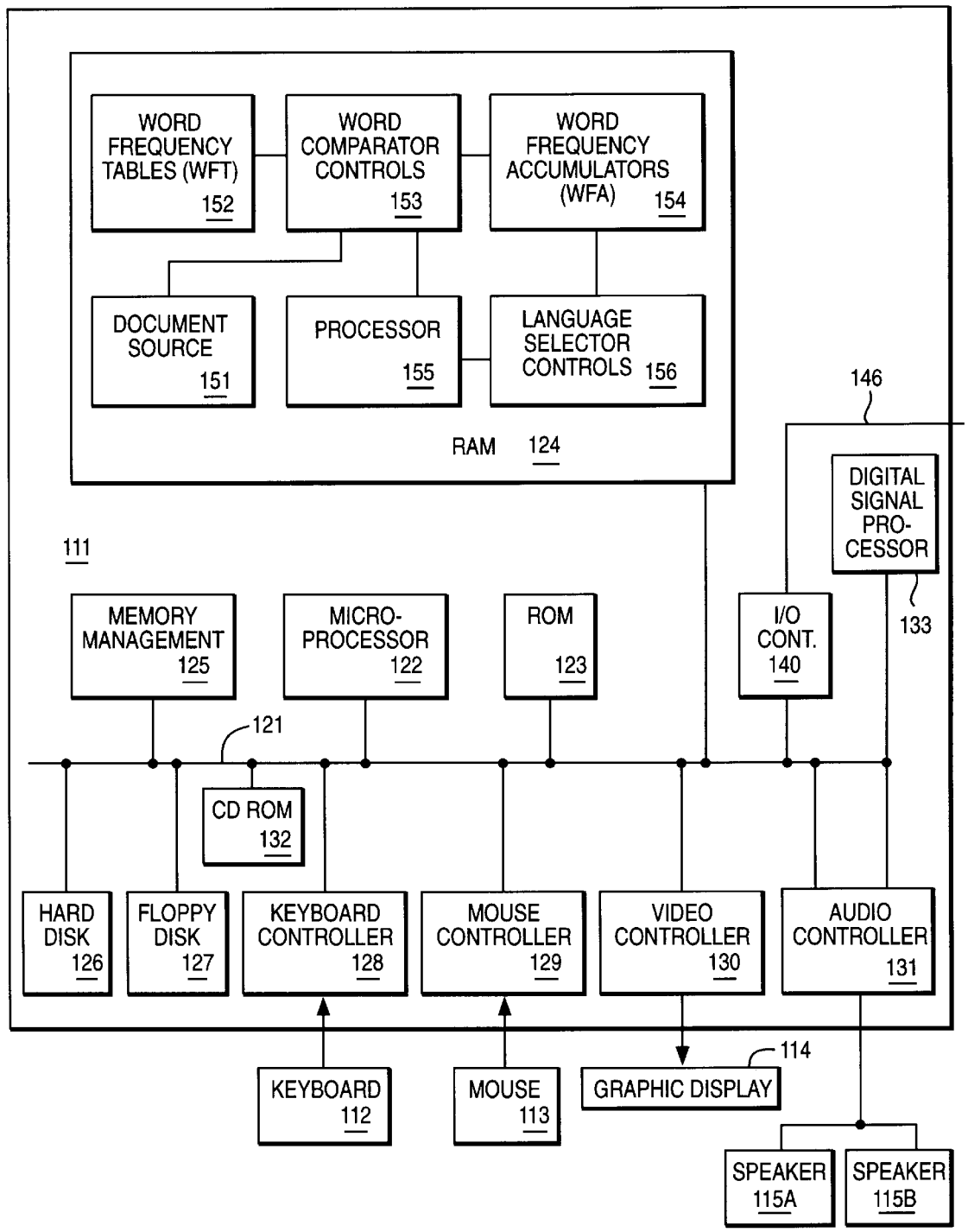
FIG. 6 is a functional block diagram of the current invention, a general data processing system containing data and controls for determining the language of a document.

FIG. 6 shows an overall block diagram of a general system configuration supporting an embodiment of the invention. It contains components which may be formed of hardware and/or software components in the system. The invention may be run on a variety of computers or collection of computers under a number of different operating systems. The computer could be, for example, a personal computer, a mini computer, mainframe computer or a computer running in a distributed network of other computers. Computers in the IBM PC series of computers could be used in the present invention running on the IBM OS/2 Warp 3.0 operating system. Again, the hardware requirements are very modest. The hardware embodiment could be implemented in an Intel 8086 processor with 16 KB of memory, probably less.

In FIG. 6, a computer comprising a system unit 11, a keyboard 112, a mouse 113 and a display 114 are depicted in block diagram form. The system unit 111 includes a system bus or plurality of system buses 121 to which various components are coupled and by which communication between the various components is accomplished. The microprocessor 122 is connected to the system bus 121 and is supported by read only memory (ROM) 123 and random access memory (RAM) 124 also connected to system bus 121. The ROM 123 contains among other code the Basic Input-Output system (BIOS) which controls basic hardware operations such as the interaction and the disk drives and the keyboard. The RAM 124 is the main memory into which the operating system and application programs are loaded. The memory management chip 125 is connected to the system bus 121 and controls direct memory access operations including, passing data between the RAM 24 and hard disk drive 126 and floppy disk drive 127. The CD ROM 132 also coupled to the system bus 121 is used to store a large amount of data, e.g., a multimedia program or presentation.

Also connected to this system bus 121 are various I/O controllers: The keyboard controller 128, the mouse controller 129, the video controller 30, and the audio controller 131. As might be expected, the keyboard controller 128 provides the hardware interface for the keyboard 112, the mouse controller 129 provides the hardware interface for mouse 113, the video controller 30 is the hardware interface for the display 14, and the audio controller 131 is the hardware interface for the speakers 115 and 13. An I/O controller 140 such as a Token Ring Adapter enables communication over a network 146 to other similarly configured data processing systems.

One of the preferred implementations of the invention is as sets of instructions and data structures 151–156 resident in the random access memory 124 of one or more computer systems configured generally as described above. Until required by the computer system, the set of instructions may be stored in another computer memory, for example, in the hard disk drive 126, or in a removable memory such as an optical disk for eventual use in the CD-ROM 132 or in a floppy disk for eventual use in the floppy disk drive 127. The program may also be stored in the memory of another computer system to be sent over the network or an external network such as the Internet when desired. One skilled in the art would appreciate that the physical storage of the sets of instructions physically changes the medium upon which it is stored or transmitted electrically, magnetically, or chemically so that the medium carries computer readable information.

While it is convenient to describe the invention in terms of instructions, symbols, characters, or the like, the reader should remember that all of these and similar terms should be associated with the appropriate physical elements. Further, the invention is often described in terms of comparing or identifying, or other terms that could be associated with a human operator. No action by a human operator is desirable in any of the operations described herein which form part of the present invention; the operations are machine operations processing electrical signals to generate other electrical signals.

As described herein, the invention applies for any language or genre using an alphabet without regard to the printed symbols used for that language. As a computer document, all such symbols are processed as binary codes in a computer machine, rather than human readable symbols.

The data and logic blocks in RAM 124 are now discussed in greater detail. Coded data input is provided from a Document Source 151, which provides coded characters representing text of a document generated by using words of any human language. Before resident in RAM, document source 151 may be provided by an optical character reader reading the coded characters from a hard copy of a document. Alternatively, source 151 may be coded characters read from a soft copy of a document stored in an internal storage, e.g., floppy disk, tape or compact disk of the system, or source 151 may originate as coded characters transmitted on a network to the data processing system from some remote location using a similar system reading the document from one of its terminals or peripheral devices.

Each of the word tables 152 is associated with a respective language which can be detected as the language of source document 151. The construction of the word tables is as set forth above. The set of particular languages represented by tables 152 are called the languages of interest, or candidate languages. A language not represented in tables 152 cannot be detected as the language of the incoming document source 151. As mentioned above, in one preferred embodiment when the strong aliases are omitted, different word tables 152 are available for a respective candidate language. The decision which word tables are to be used is made when the candidate languages of the incoming document are known.

The text from the source 151 is provided in variable-length word units to the comparator 153. In a hardware embodiment, the comparator can be part of a processor. The comparator controls 153 compare each variable length word received from source 151 with words in a plurality of language word tables 152. As discussed in preferred embodiments below, words of different length are stored in different word tables. Thus, in these embodiments, it would make sense to compare only those words of the same length to the words in the appropriate word table.

Each word received from document source 151 is compared by the comparator 153 with the words in the tables 152. The comparator 153 determines an equal or unequal condition between each inputted document source word and each table word read from the word tables 152. The words in each of the plurality of the word tables 152 may be scanned until all words in all of the tables 152 are compared by the comparator 153.

In the hit/miss vector, wherever a word from a document matches a word in a word table, the appropriate position in the vector is set. When weights are used, whenever a word in any word table 152 is found to compare equal to a source document word, the weight or the frequency value associated with the word is read out by the processor 155. Then, that frequency value is used to set the position in the vector. After the vector is summed, and possibly normalized by the number of words in the interval, the sum is stored in a language shift data structure 154 which is associated with the language of the table. As the interval is moved through the document, the new language shift data, e.g., language shift points, language percents, accumulated sums, line slopes are saved in the crossover data structures 154 associated with each candidate language.

In the batch mode, the language switch point identification processing stops when the source words stop being inputted when the document source 101 reaches the end of the current document. Next, the refinement of the crossover points may start where the syntax engine 156 parses the text for punctuation, font changes, indentation and so forth. Then, the main dictionaries for the identified languages can be brought to bear.

In the continuous or on the fly mode, the crossover identification, syntax refinement of crossover points and main dictionary lookup happen as the interval moves through the document. The batch and continuous modes each have their advantages. The batch mode is advantageous when the candidate languages are unknown. Because of the storage and attendant lags in processor response time associated with each large dictionary, it would be desirable to wait until the candidate languages are known before loading the main dictionaries in memory. Where the candidate languages are known and relatively few in number, the continuous mode might be most advantageous as the memory requirements would not be as great and the process would require only a single pass through the document. As yet another embodiment, the syntax and main dictionary process could be combined in a single pass once the languages are identified, since the memory and processing associated with the syntax refinement process is small.

During processing, each crossover data structure stores the vector sums according to the common words in each language found in the moving interval in the document. In the binary hit/miss method, the sum may be a pure count of the common words, or may be normalized by the length of the interval. In the weighted method, which is of interest to genres, the sums contained by each accumulator are a total of the weights of the common words in the moving interval as it moves through the source document which match a common word in the associated word table for the same language. For each match of a word in the source document with a word in any of the word table, i.e. one or the weight, for that word is added to the vector for that language, summed and stored in the associated crossover data structure.

Word Storage Tables for Natural Language Determination

As detailed to the copending application "Natural Language Determination Using Partial Words" incorporated above, there is a particular embodiment of natural language determination, storing the word lists and identifying the languages in a document, which is exceptionally fast in hardware. This embodiment can be used in the present invention as the preferred process for identifying hits in the overall process of detecting language shifts as discussed above.

The advantage of the storage method is that it allows storage of the dictionary words in a relatively small and fixed amount of memory. The storage size does not grow as a function of the number of words added to the dictionary. That is, words may be added to the dictionaries, up to a point, without increasing the storage required. For a hardware implementation, the invention will provide single cycle access to determine if a word is stored in the tables. The size invariant nature of the storage requirement is particularly important for hardware implementations as it allows for some dictionary growth without a concomitant hardware increase.

According to this embodiment of the invention, the basic unit of word storage is an n×n bit table, where each bit represents a given letter pair at a particular place in a word in one of the languages under consideration. The basic table for English, prior to initialization, looks like this:

|   | A | B | C | ... | Z |
|---|---|---|---|-----|---|
| A | 0 | 0 | 0 |     | 0 |
| B | 0 | 0 | 0 |     | 0 |
| C | 0 | 0 | 0 |     | 0 |
| . |   |   |   |     |   |
| . |   |   |   |     |   |
| . |   |   |   |     |   |
| Z | 0 | 0 | 0 |     | 0 |

In the preferred embodiment, the blank, apostrophe or hyphen are not considered as characters. In certain alternative embodiments, it may be useful in certain situations to do so. For example, foreign languages which make significant use of special characters, such as the French and Italian which use the apostrophe heavily as compared to English. When word tables are used to store words of different lengths, a blank character is necessary to store the shorter words. For example, if the word "in" were to be stored in a 3 letter word table, a blank character would be inserted after "in".

This storage method can be implemented in software and firmware as well as hardware. However, since most software addressing is on a byte basis rather than a bit basis, it is doubtful that the software embodiment will approach the speeds possible in hardware. However, with clever reusable threads using a multiprocessor system, it may be possible.

To store a word of n letters requires the use of $$(i=1 \text{ to } (n-1)) \text{ SIGMA } i, \text{ for } n>=2$$

such tables. To store words of 2 letters, one table is required. Storage of 3 letter words requires 1+2 or 3 tables. To store a words of 5 letters requires the use of 10 such tables (1+2+3+4). The applicants have observed that the most common words in languages are the shortest, hence it will be a rare language that will have many common words with more than 6 letters.

However, there are languages whose common words will tend to be long, e.g., Hawaiian. In an alternate embodiment the entire word is not stored, but only an abbreviation of the word. The abbreviation preferably will be constant for all words, e.g., the first four or five letters. In English, for example, among the first 96 most common words, only two are longer than five letters, "before" and "through".

"Weak aliasing" is where one or more words masquerades within the word storage tables as another word from the same language. Weak aliasing is not a problem for the invention. Longer words may be truncated and be counted as having the same five letters unless the system were programmed to take only words of a certain length. Thus, other words which are not the most common words would also be counted. In Italian, counting "quella" for "quelle" does not matter so long as it is counted for Italian. The second kind of aliasing, is called strong aliasing, where a word or its abbreviation in one language masquerades in the word storage tables as a word from a different language can be a problem. For example, if the high frequency word "das" occurs in candidate language 1 (German) and masquerades in candidate language 2, (French) then the word count for candidate language 2 will be incorrectly biased larger than it actually was by the strong aliasing of "das". Strong aliasing can be eliminated, where necessary, by removing one or more words from one or more word tables for the candidate languages.

This illustrative embodiment of the invention assumes that 5 letters are sufficient for recognition; the extension to longer words is obvious. The 10 tables required for words of 5 letters can be thought of as arranged in a tableau as:

| T(1, 2) | T(2, 3) | T(3, 4) | T(4, 5) |
|---------|---------|---------|---------|
| T(1, 3) | T(2, 4) | T(3, 5) |         |
| T(1, 4) | T(2, 5) |         |         |
| T(1, 5) |         |         |         |

Figure 7:
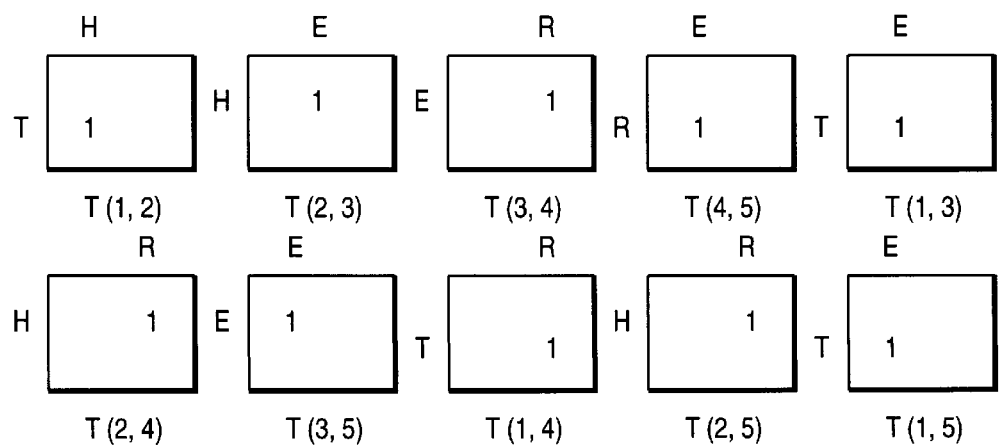
FIG. 7 is a diagram of a tableau of word tables for storing five letter words.

To initialize the word tables for English, FIG. 7 shows the invention using "there" as one of the high frequency words that will be used to discriminate among the different languages. Then, in table T(1,2) set the bit at the intersection of "t" and "h" to 1. In table T(2,3) set the bit at the intersection of "h" and "e" to 1. Continue so that in table T(3,4) the bit at the intersection of "e" and "r is equal to 1, and in table T(4,5) the bit at the intersection of "r" and "e" is equal to 1. This completes the initialization of the tables in the first row. Continue by setting the bit at the intersection of "t" and "e" in T(1,3) to a 1, and the bit at the intersection of "h" and "r" in table T(2,4) to 1. The process continues by setting the bit at "e", "e" in table T(3,5) to 1. Continue by setting the bit at the intersection of "t" and "r" in T(1,4) to a 1 and the bit at "h", "e" T(2,5) to a 1. Finally, set the bit at "t" "e" in table T(1,5) to 1. In general, if a word consists of letters, 1(1) through 1(5), in order, then the letter pair l(1)l(2) is stored in T(1,2) and so on.

At this point, the word "there" has been stored in the word tables for 5 letter words as a set of 1 bits where the bits selected for setting represent all the ordered "letter pairs" of the word. That is, the tables of the first row contain, "th," "he," "er," and "re," while the tables in the second row contain "te," "hr," and "ee." The third row tables contain "tr" and "he" and the table in the last row contains "te."

This method of storing the words provides enough relationships among the letters of the words so that only the words stored in the tables will verify. So long as the tables remain sparsely populated, and they will using the method disclosed, the only 5 letter words that will verify correctly in the tables are those that have been entered for the given language. A discussion below provides guidelines for sparsely populated word tables.

If "then," "stem," and "shin" were stored in the 4 letter word tables, the misspelling in an English document of "shen" would also verify and would be an example of weak aliasing. Errors which will occur due to misspellings do not occur often enough to be a concern. In fact, this method works as there are relatively few words required to determine the natural language in which a document is written. Therefore, the misspelling exposure is to a small set of words in the language. If the tables were to become overpopulated, i.e. many words in the word tables, the discrimination accuracy would decline.

After the word tables have been created for each candidate language for which determination is desired, the process described above, where a moving interval of words is read, one at a time, from an input document having its language or genre crossover points identified is performed. Each word read is split into the appropriate letter pairs, as defined by the tables for the various word lengths, and the bit stored at the intersection of each of the pairs of letters from each table is read out of the tables. This is done for each of the candidate languages. For a 5 letter word in the document, this results in a set of 10 bits which may represent a word from none to all of the languages under consideration. The 10 bits are ANDed together and, if the result is 1 for a given language, that word is represented in the tables for that language. Similarly, if the ANDing of the 10 bits yields a 0, the input word is not stored in the tables for that language.

While it may seem surprising that the words for a candidate language may be stored together as sets of bits, given the possibility for aliasing with different permutations of letters, the applicants have determined that the storing method of the invention works well so long as the sparsely populated requirement is met.

Specialized Hardware

This section describes a means to identify the language in the interval as it is moved through a computer document in hardware such that processing time can be minimized. That is, the key portion of the process can be made to execute with true parallelism in hardware or on any sufficiently parallel processor implementation. Any reasonable firmware or software implementation of the word table storage method described above will also be very fast and require a small amount of storage for data.

This invention provides an internal representation of the word tables as described above in such a way that the determination that a given input word is, or is not, contained in one of the word tables can be done in one machine cycle per word. The representation of the words makes possible speeds which can not be obtained in any other way. Furthermore, the invention can be "pipe-lined" so that not only are the input words processed in parallel for a plurality of languages, there would be multiple words at the different stages of processing at any point in time.

In summary, the invention will determine the language shifts which occur in a document by using the Word Storage Tables for Natural Language Determination, as described above.

The word storage tables provide what is conceptually an engine that is used to create and update the language vectors and hit percentages used to determine the crossover points, i.e. language change points, within the documents. A set of word statistics for each of the languages under consideration must be obtained and word tables prepared. As discussed above, for essentially all the interesting cases, the statistics already exist. The method then consists of obtaining words, one at a time from the document, determining to which languages they could belong and, for the document as a whole, selecting as a result the language with the most matches. The value of this hardware embodiment is the performance improvement over a software or firmware implementation and the simplification of the identification process. The improvement results from the internal representation of the word storage tables and the supporting hardware which allow the process to run in parallel and pipelined.

In this illustrative embodiment, a fully parallel hardware implementation is described. Differences between parallel and serial implementations are discussed below. A fully parallel implementation assuming 8 languages will be described; extension to more languages is obvious, as is a smaller implementation for fewer language. For best performance, there will be one set of hardware for each language; this permits a single pass through the subject text and determination for all languages during that single pass. If the number of languages exceeds the hardware availability, additional passes through the document will be needed along with hardware initialization.

Figure 8:
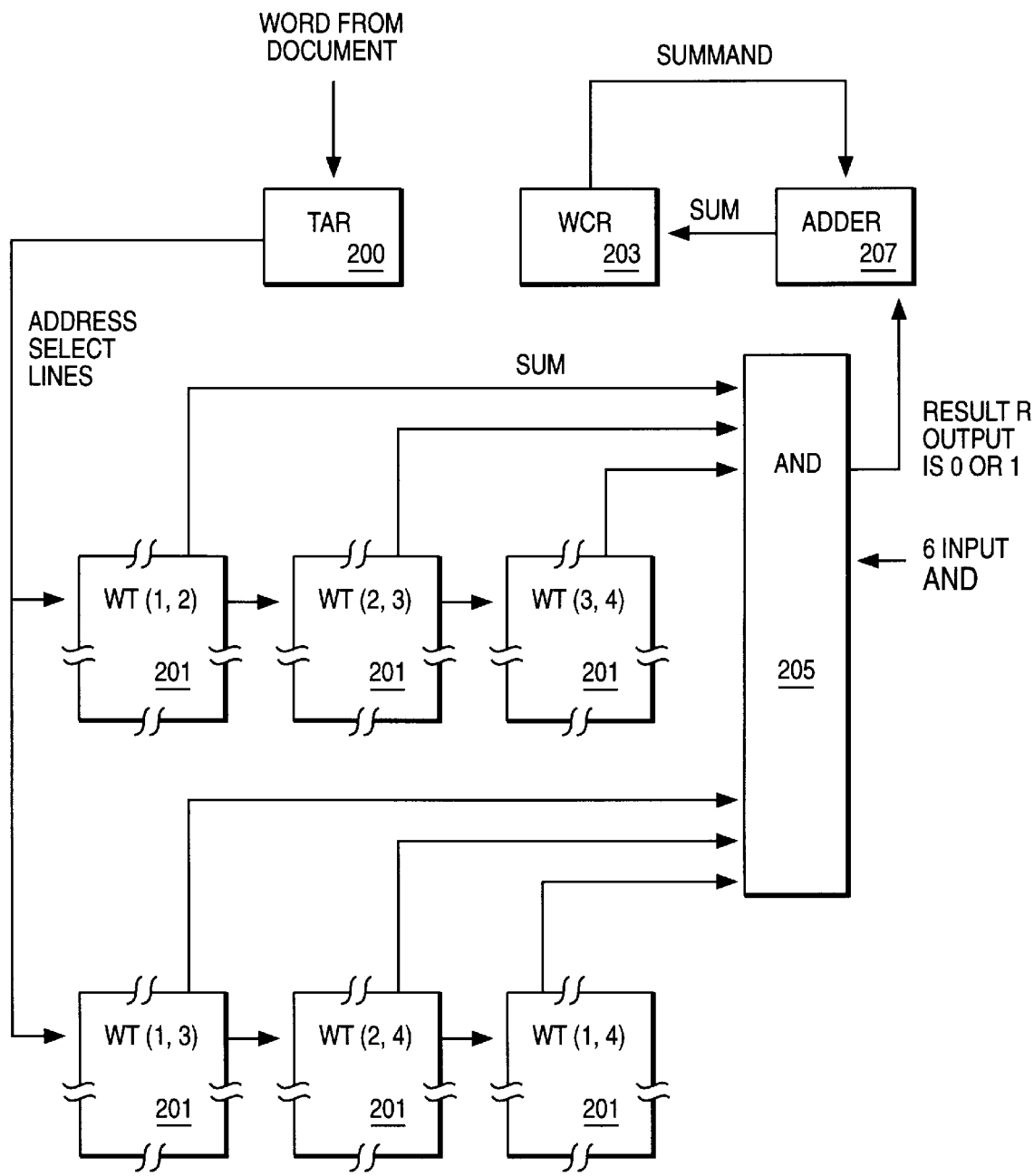
FIG. 8 is a hardware block diagram for a fully parallel implementation of the invention.

The basic hardware consists of a set of Table Access Registers (TAR's) 200, one for each of the languages that will be verified in parallel, a set of word tables 20/(WST) for each language and a Word Count Register (WCR) 203 for each language. Supporting hardware includes AND's 205 and ADDER's 207. The basic structure for a single language is depicted in FIG. 8.

Figure 9:
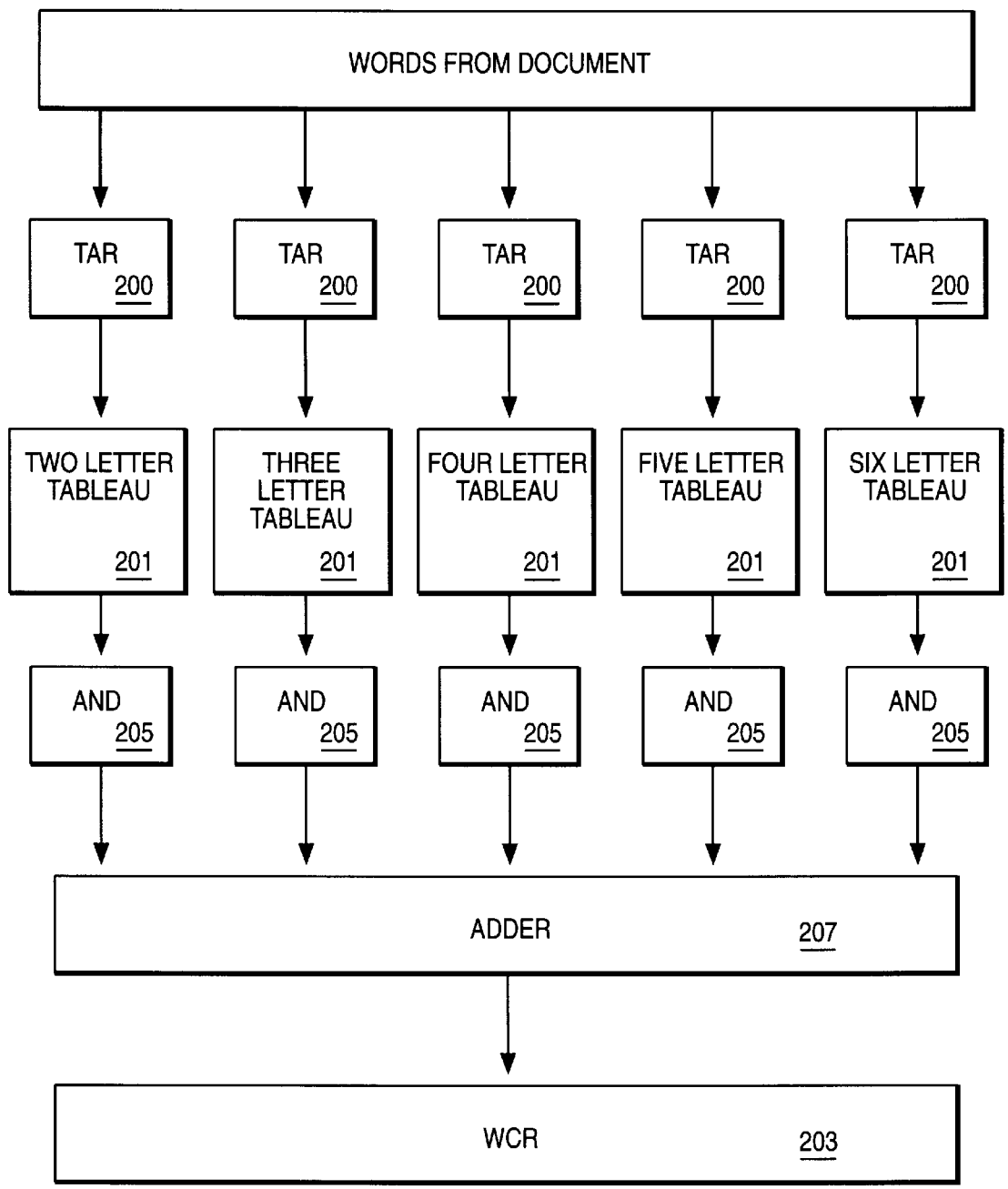
FIG. 9 is a hardware block diagram for a plurality of tableaus for storing different length words.

The hardware shown is for a single language with word table for a word length of four letters. For other word lengths as described above in the preferred embodiment, larger and smaller word table tableaus are required for 2, 3, 5 and 6 letter words. For eight candidate languages, each of the five word tableaus for different length words would be replicated. Table 6 below shows the hardware required by language and word length. FIG. 9 shows another hardware block diagram of the hardware required for a single language where the tableaus of tables are simplified in illustration.

TABLE 6

Hardware Requirements for Fully Parallel Implementation

| Element | Requirement | For 8 Languages |
|---|---|---|
| WST | 35 per language (2–6 ltrs) | 280 |
| TAR | 1 per word length & language | 40 |
| AND | 1 per word length & language | 40 |
| ADDER | 1 per language | 8 |
| WCR | 1 per language | 8 |
| CMPTR | 1 per unit | 1 |

The words are preferably stored in the hardware embodiment as described above in the Word Storage Table section. The word tables could also use content addressable memory. This is much more expensive, however, and generally the content addressable memory would have to be enlarged to add more words.

The basic unit of word storage is an n×n bit table, where each bit represents a given letter pair in one of the languages under consideration. As discussed above, to store a word of 5 letters requires the use of 10 such tables. The tables can be used for all word lengths from 2 to 5 letters, but for speed, each given word length will be assigned its own set of tables.

From the point of view of the device and algorithms, both the words to be stored and those fetched from the document may be truncated to the same length words. The fact of the truncation does not otherwise impact the process. As detailed below, in the discussion about "partial words", truncating words actually improves discrimination.

Storing the words as sets of bits representing the ordered "letter pairs" of a word provides enough relationships among the letters of the words so there will be a minimum of aliasing during word verification. So long as the table remains sparsely populated, as discussed above, for all practical purposes, the only 5 letter words that will verify correctly in the tables are those that have been entered for the given language. If the tables are allowed to become overpopulated, the discrimination accuracy would decline.

After the tables have been created for each language for which determination is desired, the process continues by reading an appropriately delimited character string word, from the document being considered. From the point of view of the device and algorithms, simply truncating both the words to be stored and those fetched from the document to the same length works. The fact of the truncation is not relevant other than the discussion about "partial words" which actually improve discrimination. If the word length matches one of the lengths for which the tables have been built, i.e. typically be 2 to 6 characters but can be varied, the word or character string is loaded into the appropriate length special purpose register, e.g., a table access register, or TAR, 200 for accessing the word tables. The TAR's are constructed so that each byte of the register provides addressing to several of the tables in the associated tableau 201. For example, the first byte of the 4 character TAR, that is, the TAR for 4 byte/character words, provides the row address for tableau tables T(1,2), T(1,3), and T(1,4). Correspondingly, the second byte of the TAR for 4 character words provides the row addressing for T(2,3) and T(2,4) and column addressing for T(1,2).

The remaining bytes of the TAR provide the other addressing required. Table 7 below shows the addressing for the entire 4 byte TAR, by TAR byte:

TABLE 7

TAR Addressing Scheme

| TAR Byte | 1 | 2 | 3 | 4 |
|---|---|---|---|---|
| ROWS | T(1, 2)<br>T(1, 3)<br>T(1, 4) | T(2, 3)<br>T(2, 4) | T(3, 4) | None |
| COLS | none | T(1, 2) | T(2, 3)<br>T(1, 3) | T(3, 4)<br>T(2, 4)<br>T(1, 4) |

In an alternative embodiment, a single TAR will suffice per language; the unused addressing lines are not a problem, so that a 4 byte word in a 6 byte TAR is logically fine. However, this will require more fan out for the address lines, so in the preferred embodiment different length registers are disclosed. If the technology can drive a large fan out, then the number of TAR's can be reduced.

Using the TAR addresses for the 4 bytes, the following logical expression for a result R is computed (where AND is the logical AND operation):

R=T(1,2) AND T(2,3) AND T(3,4) AND T(1,3) AND T(2,4) AND T(1,4)

If the result R, is a one, then the four characters currently held in the 4 byte TAR are recognized as a word in the given language. If the result R is a zero, then the characters are not recognized as a word in this language. To maintain a running total of the number of words recognized in the given language, it is only necessary to add R to the current sum for that language. If the contents of the TAR were not recognized as a word in the language, then R is zero and adding it to the running total for the language will not increase the total for that language.

To give a precise definition to the running total, which is called the "word count" and is computed separately for each of the candidate languages, it is the sum over all words fetched of the respective R values. That is, WORDCOUNT=(i=1) SIGMA (i=n) R(i).

The word count for each language is accumulated in a separate register for that language in a fully parallel implementation. When all the words have been examined, the Comparator is used to determine which of the languages has the largest count; that language is then selected as the most likely natural language of the document.

The processing for the determination of word in a body of text has the following steps: Step 1: A word from the document under consideration, whose length is equal to or less than the largest that will fit into a TAR, is selected and loaded into the appropriate length TAR. In the partial word embodiment the words may be truncated to the length in use. Step 2: The letters of the word in the TAR are used in the combinations described to access a single bit in each of the appropriate word tables for all the languages under consideration. Step 3: The bit outputs of the accessed word tables are AND'd together to produce a result bit, R for each of the languages.

Note that in general, the tables will need to be larger than 26×26 since a number of languages have more than 26 letters. Languages with very large "alphabets" such as Japanese are best treated by using a different pattern of word table wherein each language has a single table of less than 256×256 bits and each ideogram or other language symbol such as katakana is assigned separately.

In this case, the language can be thought to be made of only 2 "character" words, where the first byte of the DBCS representation is the first "letter" and the second byte is the "second" letter. Then a single table "tableau", is used since all words are two letters and the hardware is significantly reduced. At this time, there are only 4 languages that require this alteration, although all are very important. They are Japanese, Korean and the two variants of Chinese, the PRC variant (modern) and the ROC variant (classical). Holding the bit requirements at 65,536 across all languages leads to a table size of 43 characters for alphabetic language, and this is sufficient for both the alphabetic and ideographic languages.

There are a number of alternative embodiments to the hardware described in this section. Some of these are identical to those discussed above such as eliminating common words from the word tables of different candidate languages to reduce aliasing. Other modifications to those that are particular to this hardware embodiment are discussed below.

A reduced-cost hardware implementation is possible by providing for multiple passes through the document and using a single set of hardware. Each pass results in the hardware WCR producing a single number that represents the value of the language that was loaded into the word storage tables. A reset is needed to assure that the word tables are cleared before reload for a new candidate language. No comparator is required in the hardware. This approach sacrifices speed for hardware cost and requires more complicated software, i.e. reinitializing and comparing software.

A reduced-cost hardware implementation is also possible using just a single set of word tables, rather than a tableau for the different word lengths. Again, this will force multiple passes through the document and sacrifices speed for cost. In addition to loading the word tables for each language, the word tables may be loaded for each of the different word lengths within each language. Alternatively, a single tableau can be used for all word lengths if it is sparsely populated.

The word tables can be replaced by content addressable memory that returns a 1 if the word is in one of the memory locations and a zero (0) if the word does not match the contents of any location. This embodiment would not use the TARs but would instead use a logically equivalent comparand register. Although this is a logically equivalent implementation, it will be slower as the CAM cycle time to obtain the comparison result is longer. Content addressable memory is also much more expensive than required for the disclosed device. However, TAR fan out can be avoided by using content addressable memory and it may be possible to load all languages into the memory at the same time. This would be faster than the serial implementation, but not so fast as the parallel one.

While the description above has discussed the preferred embodiment where word lists of common words are used to identify the natural language within an interval, the reader is reminded that other methods of language identification, e.g., trigrams, could be used.

While the invention has been shown and described with reference to particular embodiments thereof, it will be understood by those skilled in the art that the foregoing and other changes in form and detail may be made therein without departing from the spirit and scope of the invention.

We claim:

1. A method for detecting language shift points in a computer document written in a plurality of natural languages, comprising the steps of:

moving an interval through a text document in a computer memory, the interval containing a plurality of words in the document;

for each position of the interval, determining a probability that text in the interval is written in each of a plurality of candidate languages according to a respective number of matches of words in the interval with words in each of a plurality of word lists of a few common words selected from each respective candidate language;

for a first position of the interval, classifying a first candidate language having the highest probability as the current language within the interval;

finding a language shift point in the document where the probability that a second candidate language is higher than the current language for a new position of the interval; and classifying the second candidate language as the current language in the document after the language shift point.

2. The method as recited in claim 1 wherein the determining step comprises the steps of:

comparing words in the interval with word lists comprised of common words in each of the candidate languages;

counting a number of words in the interval which match the common words in each respective word list; and determining the relative probability of each candidate language based on a cumulative count of words in the interval which match for each respective candidate language.

3. The method as recited in claim 2 wherein the count for each word is weighted by a factor in the cumulative count.

4. The method as recited in claim 2 wherein the common words selected for the word lists are chosen so that strong aliases between candidate languages are not included.

5. The method as recited in claim 4 wherein the candidate languages to be compared to the document are selected before the language shift determination from all the candidates languages for which word lists are stored, and wherein the strong aliases between the selected candidate languages are removed from master word lists for the selected candidate languages composed of common words in each selected candidate language.

6. The method as recited in claim 2 wherein partial words are used in the comparing step.

7. The method as recited in claim 1 further comprising the steps of:

searching the document for syntax cues proximate to the found language shift point; and responsive to finding syntax cues, shifting the language shift point if indicated by the found syntax cues.

8. The method as recited in claim 7, wherein the method operates in batch mode, so that a plurality of language shift points are found in a first pass through the document and syntax cues proximate to the language shift points are searched for in a second pass through the document.

9. The method as recited in claim 1 further comprising the steps of:

performing a language related operation on the document according to a first dictionary for the first candidate language prior to the language change point; and performing the language related operation on the document according to a second dictionary for the second candidate language after the language change point.

10. A system including processor and memory for detecting language shift points in a computer document written in a plurality of natural languages, comprising:

interval defining means for moving an interval through a computer document in the memory, the interval containing a plurality of words in the document;

language comparing means for determining for each position of the interval a probability that text in the interval is written in each of a plurality of candidate languages according to a respective number of matches of words in the interval with words in each of a plurality of word lists of a few common words selected from each respective candidate language;

language determining means for determining for each position of the interval the candidate language having the highest relative probability within the interval;

language shift determining means for finding language shift points in the document according to the positions of the interval where the candidate language having the highest relative probability changes from prior positions.

11. The system as recited in claim 10 wherein the language comparing means comprises:

means for comparing words in the interval with word lists comprised of common words in each of the candidate languages;

means for determining a number of words in the interval which match the common words in each respective word list; and means for determining the probability of each candidate language based on the number of words in the interval which match for each respective candidate language.

12. The system as recited in claim 11 wherein the common words in the word lists are chosen do not include strong aliases between candidate languages being compared.

13. The system as recited in claim 12 wherein the candidate languages to be compared to the document are selected from all the candidate languages for which word lists are stored, and wherein the strong aliases between the selected candidate languages are removed from master word lists for the selected candidate languages before language shift determination takes place.

14. The system as recited in claim 11 wherein the words in the word lists are stored as bits in N×N bit tables, where each bit represents a given letter pair at a particular place in a word in one of the candidate languages.

15. The system as recited in claim 14 wherein the bit tables are arranged in tableaus, each tableau for storing words of a particular length for a given candidate language.

16. The system as recited in claim 11 wherein the interval contains non adjacent words.

17. The system as recited in claim 10 further comprising dictionaries for performing a language related operation on the document for the candidate languages.

18. A computer program product in a computer readable medium for detecting language shift points in a computer document written in a plurality of natural languages, comprising:

means for moving an interval through a computer document in a computer memory, the interval containing a plurality of words in the document;

means for determining a probability that text in the interval is written in each of a plurality of candidate languages within the interval according to a respective number of matches of words in the interval with words in each of a plurality of word lists of a few common words selected from each respective candidate language; and means for finding language shift points in the document according to changes in the relative probabilities of the candidate language as the interval changes positions in the document.

19. The product as recited in claim 18 further comprising:

means for comparing words in the interval with word lists comprised of common words in each of the candidate languages;

means for determining a number of words in the interval which match the common words in each respective word list; and means for determining the probability of each candidate language based on the number of words in the interval which match for each respective candidate language.

20. The product as recited in claim 19 wherein the common words in the word lists are chosen do not include strong aliases between candidate languages being compared.

21. The product as recited in claim 20 further comprising:

means for selecting the candidate languages to be compared to the document from a plurality of candidate languages for which word lists are stored;

a master word list for each candidate language; and means for removing the strong aliases between the selected candidate languages from the master word lists for the selected candidate languages before language shift determination takes place.

22. The product as recited in claim 18 further comprising dictionaries for performing a language related operation on the document for the candidate languages.

23. The product as recited in claim 18 further comprising:

means for searching the document for syntax cues proximate to the language shift points; and means responsive to finding syntax cues for shifting the language shift point if indicated by the found syntax cues.

24. A method for detecting language shift points in a computer document written in a plurality of natural languages, comprising the steps of:

selecting successive pluralities of words located at successive locations in the document;

for each plurality of words, recognizing no words or one or more words, but not all words, as being members of each of a respective candidate language;

for each plurality of words, classifying the plurality of words as being written in a respective language according to a greatest number of words in the respective plurality of words being recognized as members of the respective language; and finding language shift points in the document according to where the respective languages of successive pluralities of words change according to the classifying step.

25. The method as recited in claim 24, wherein each successive plurality of words shares a predetermined number of words with a predecessor plurality of words and a successor plurality of words.

26. A method for detecting language shift points in a computer document written in a plurality of natural languages, comprising the steps of:

selecting successive pluralities of words located at successive locations in the document, wherein each plurality of words includes a first number of words of which a second number of words is shared by a next plurality of words;

for each plurality of words, classifying the plurality of words as being written in a respective language according to a greatest number of words in the respective plurality of words being recognized as members of the respective language; and finding language shift points in the document according to where the respective languages of successive pluralities of words change according to the classifying step.

* * * * *

UNITED STATES PATENT AND TRADEMARK OFFICE
CERTIFICATE OF CORRECTION

PATENT NO : 5,913,185
DATED : June 15, 1999
INVENTOR(S) : Martino et al

It is certified that error appears in the above-identified patent and that said Letters Patent are hereby corrected as shown below:

On the face page, the last line of section [56], please delete "Jeffrey S. LaBaur" and insert --Jeffrey S. LaBaw--;

Signed and Sealed this

Twenty-second Day of May, 2001

Attest:

NICHOLAS P. GODICI

Attesting Officer

Acting Director of the United States Patent and Trademark Office